April 29, 1924.
I. C. POPPER
1,492,388
METHOD OF TREATING CHEESE AND PRODUCT RESULTING THEREFROM
Filed July 12, 1923
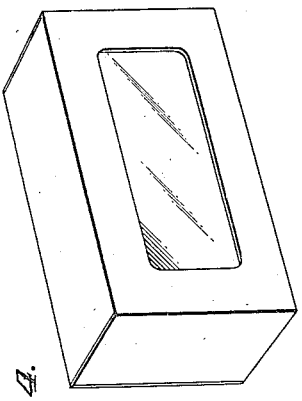
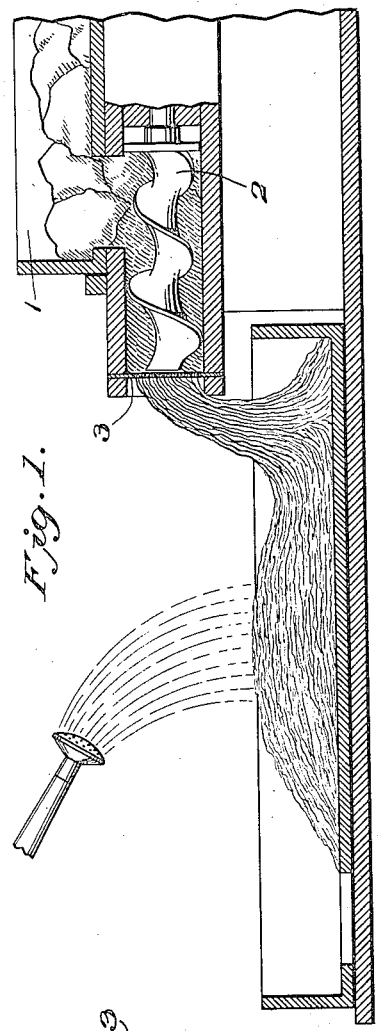
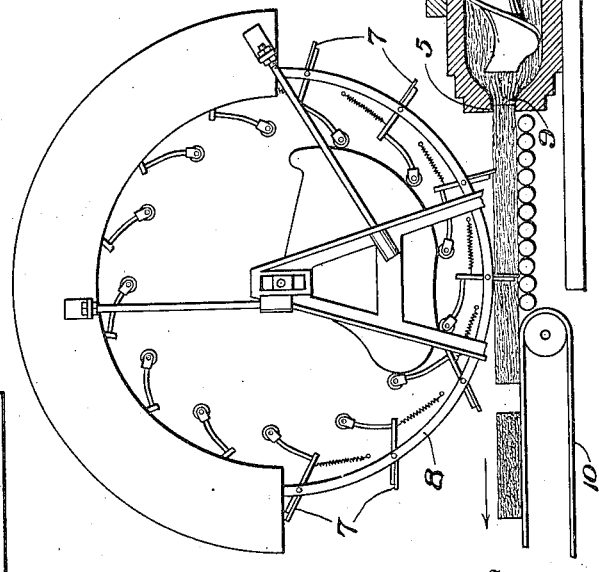
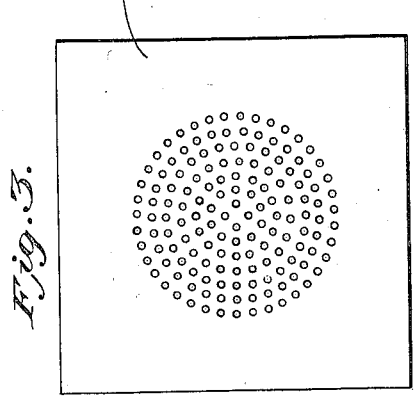
Inventor
Isaac C. Popper
By Vernon C. Hodges
his Attorney Patented Apr. 29, 1924.

1,492,388

UNITED STATES PATENT OFFICE.

ISAAC C. POPPER, OF NEW YORK, N. Y.

METHOD OF TREATING CHEESE AND PRODUCT RESULTING THEREFROM.

Application filed July 12, 1923. Serial No. 651,173.

*To all whom it may concern:*

Be it known that I, ISAAC C. POPPER, a citizen of the United States, residing at New York city, in the county of New York and State of New York, have invented certain new and useful Improvements in Methods of Treating Cheese and Products Resulting Therefrom, of which the following is a specification.

This invention relates to a method of treating cheese, and to the improved product resulting therefrom.

It has become customary to transform cheese from its original form in which it must be made, into so-called loaves for greater convenience in marketing.

In doing this, the cheese, such as Daisy, long-horn, Cheddar, etc., is first cleaned and then cooked until it becomes of a consistency that will flow, or plastic enough to be forced by hand into a form or box mold to take on a loaf shape. This loaf is then wrapped in tin-foil. In this loaf form, cheese is being sold in great quantities in groceries, delicatessen stores and elsewhere on account of its being more easily handled by the store-keeper than was possible in the large cheese as originally made.

It is recognized by those who know, that the food value of cheese worked over in this manner, is greatly lessened, and some have likened it to a cold Welsh rarebit, which is rendered unwholesome as a diet. In short, a great deal more is sacrificed than is gained by this treatment, since, for instance, the original flavor of the American cheese is changed, and furthermore, its character as a whole has become changed in every way greatly to its detriment rather than its advantage.

In working the American cheese over into loaf form, it has never been sucessfully marketed in sizes less than five pound loaves. While one of the objects of my invention is to make the cheese into single pounds and fractions of a pound, it is also an object to do so without cooking it over, thereby changing the composition, texture, and entire character of the product in consequence.

My method of treatment, it may be said, is to rearrange the constituent butter fat globules, and, in a measure at least, to make them more or less uniform in size, without melting or cooking the cheese or adding anything except a sufficient amount of water to restore what has been expressed out of it during the process of treatment, and finally compressing and shaping the mass of cheese treated into a more or less compact form, and finally discharging it in predetermined sizes from the machine, ready for sale, without the necessity of cutting when sold.

In my method of treatment, the cheese is neither melted nor cooked, nor is any heat applied; and that is what is meant by the term "uncooked" as employed in some of the claims.

In my treatment also, I am very careful not to disintegrate unduly the constituent globules, as it is desirable to preserve the grain of the cheese in the completed product.

In the accompanying drawing:—

The drawings are illustrative of one of perhaps a large number of mechanical appliances for carrying out my improved invention, and for the formation of my improved product, in which:—

Fig. 1 is a sectional view through the device for forming the cheese into shreds; Fig. 2 is a side elevation, partly in section, of the device for forming the cheese into cakes; Fig. 3 is a view of the reticulated plate; and Fig. 4 is a perspective view of a carton of cheese as it is sold.

After removing the cheese cloth covering from the cheese in its original form, and then cleaning it, the cheese is broken into chunks, and fed into the receptacle 1, where it is forced forward by the screw conveyor 2 to the nozzle, under a pressure of about two hundred (200) pounds to the square inch, although, of course, that is subject to variations, and out through the perforations in the reticulated plate 3.

The cheese comes out in continuous shreds, resembling macaroni or spaghetti, only it is solid instead to tubular.

Both the screw-conveyor 2 and the reticulated plate 3 are preferably made of aluminum, and it has been suggested that the superior taste of the cheese thus produced is due in part to the contact and pressure of the aluminum screw and plate with which it comes in contact in its passage through the machine under the high pressure to which it is subjected.

After the cheese has been thus highly compressed and formed into shreds, it is generally sprayed with water just sufficient to restore any loss of moisture, resulting from the compression or expression of the cheese.

After having been thus prepared, the final operation is to feed the cheese to a screw conveyor 4, whence it is forced under pressure through an outlet nozzle 5, and in contact with blades 7 of a cutter 8, which cuts it into measured lengths of, say a pound, just as fast as it is fed into the cutting machinery. If desired, the cheese can be cut into smaller sizes of say one-half or one-fourth pound, by means of one or two wires or similar devices 9 stretched across the outlet or nozzle of the machine.

There the lengths of cheese are received on a table or endless conveyor 10, and wrapped in paraffine paper or other wrapper, and placed in cartons, if desired, for the market.

The resultant of this process is a compactly formed chunk of cheese of any size desired, no matter how small, from a pound or two pounds or several pounds, for that matter, to a small fraction of a pound.

The expressing and shredding and re-compacting results in making the butter fat globules more uniform in size than heretofore, and in re-distributing them more uniformly and homogeneously throughout the entire mass of cheese. The product thus formed is superior in grain, texture, taste, and keeping qualities. It loses nothing in its percentage of water and fat by reason of this treatment, and it shows a negligible reduction in total count of bacteria by actual chemical analysis.

The resultant product not only exudes from the machine in compact and homogeneous form, and has a grain, but also the butter fat globules and curd have become more or less uniformly and evenly re-distributed in an organized mass. It also has a superior taste or flavor, and more creamy consistency due to more even distribution of the butter fats, it is less perishable, or in other words keeps longer; it does not crack, disintegrate or mold during ordinary exposure to the air as readily as does the American Daisy and other cheese when displayed for sale in stores. My present product is the result of a successful effort made to form an American cheese, by machinery, into sizes as small as a pound, half-pound or quarter pound or thereabouts, and ready for the market with practically no handling whatever except the contact of the machine, it thus being a thoroughly sanitary treatment from start to finish.

From the foregoing, it is understood that each loaf of cheese is wrapped and inserted in a carton as shown in Fig. 4 so that the handling of the cheese is thoroughly sanitary, and involves less handling for packing and shipping, and it is more easily kept in the ice-box of store-keeper or consumer.

It will be understood that the apparatus employed is not claimed in this application, and is only illustrated and described as one of many different possible mechanical means for carrying out my improved method or process, which, in a word, consists in the breaking up of the larger butter fat globules, of which cheese is mainly composed, so that all of the constituent globules are of more nearly uniform size, and the re-distribution and re-organization of all of these globules to the end that they are distributed with greater uniformity and homogeneity throughout the entire mass of cheese.

In order to accomplish this, I am by no means confined to shredding or Hennissing of the cheese, as the means for breaking up the larger butter fat globules to obtain substantial uniformity of size, this being but one of many possible mechanical means for the purpose.

I claim:

1. An uncooked cheese having its butter fat globules of substantially uniform size evenly distributed throughout, and compacted into a substantially solid mass.

2. An improved method of treating cheese which consists in expressing it through a perforated plate under high pressure, whereby to shred the same, thereby breaking up the large butter fat globules so that all globules will be more or less uniform in size, thereafter compacting the cheese in its shredded state into a solid mass and discharging it in the form of a continuous ribbon of predetermined transverse area, and automatically cutting the ribbon into predetermined lengths.

3. An improved method of treating cheese which consists in expressing it through a perforated plate under high pressure, whereby to shred the same, thereby making the butter fat globules more or less uniform in size, spraying the shredded material with water, thereafter compacting the cheese in its shredded state into a solid mass, and discharging it in the form of a continuous ribbon of predetermined transverse size and form, and automatically cutting the ribbon into predetermined lengths.

4. An improved method of treating cheese which first consists in shredding it, sprinkling the shredded product, then forcing this product through a shaping orifice under pressure from which it exudes in the form of a continuous ribbon, and finally cutting the ribbon into predetermined lengths mechanically.

5. A continuous process for treating cheese and the like, which consists in forming it into continuous shreds, whereby the butter fat globules are made more or less uniform in size, then forcing the shreds together under pressure into a solid mass, and causing it to exude in the form of a continuous ribbon.

6. A continuous process for treating cheese and the like, comprising forming it into continuous shreds, whereby the butter fat globules are made more or less uniform in size, and then forcing the shreds together under pressure into a solid mass.

7. An improved method of treating cheese which consists in breaking it up under such conditions as to rearrange the globules of butter fat and render them approximately uniform in size and more evenly distributed throughout the mass and then compacting into a solid mass, all the steps of the method being employed without the application of heat.

In testimony whereof I affix my signature.

ISAAC C. POPPER.